US009808765B2

(12) United States Patent
Kahle et al.

(10) Patent No.: US 9,808,765 B2
(45) Date of Patent: Nov. 7, 2017

(54) POLYURETHANE ADHESIVES FOR REVERSE OSMOSIS MODULES

(71) Applicant: CYTEC INDUSTRIES INC., Woodland Park, NJ (US)

(72) Inventors: Gordon Kahle, Gifford, PA (US); Richard D. Jordan, Jr., Allegany, NY (US)

(73) Assignee: ELANTAS PDG, INC., St. Louis, MO (US)

( * ) Notice: Subject to any disclaimer, the term of this patent is extended or adjusted under 35 U.S.C. 154(b) by 278 days.

(21) Appl. No.: 14/644,453

(22) Filed: Mar. 11, 2015

(65) Prior Publication Data
US 2015/0259583 A1 Sep. 17, 2015

Related U.S. Application Data (60) Provisional application No. 61/951,714, filed on Mar. 12, 2014.

(51) Int. Cl.
*C09J 175/14* (2006.01)
*B01D 61/02* (2006.01)
(Continued)

(52) U.S. Cl.
CPC ........... *B01D 61/025* (2013.01); *B01D 61/10* (2013.01); *B01D 63/10* (2013.01); *B01D 65/003* (2013.01);
(Continued)

(58) Field of Classification Search
CPC .... B01D 2313/04; B01D 61/10; B01D 63/10; B01D 65/003; C08G 18/36;
(Continued)

(56) References Cited

U.S. PATENT DOCUMENTS 3,733,426 A   5/1973   Kaufman et al.
3,747,037 A   7/1973   Earing
(Continued)

FOREIGN PATENT DOCUMENTS

CN   102850989 A   1/2013
CN   102911636 A   2/2013
(Continued)

OTHER PUBLICATIONS

International Search Report and Written Opinion for International Application No. PCT/US2015/019882, International Filing Date Mar. 11, 2015, dated Jul. 3, 2015, 11 pages.
(Continued)

*Primary Examiner* — John Kim
(74) *Attorney, Agent, or Firm* — Curatolo Sidoti Co., LPA; Joseph G. Curatolo; Salvatore A. Sidoti (57) ABSTRACT

An adhesive composition suitable for reverse osmosis modules, the adhesive composition includes (I) a polyurethane composition that includes (A) an isocyanate group-containing pre-polymer comprising a reaction product of (i) castor oil or a derivative thereof; and (ii) a polyisocyanate; and (iii) optionally a second polyol; and (B) an isocyanate-reactive polyol mixture comprising: (i) a polybutadiene polyol; and (ii) a urethane catalyst; and (iii) optionally the second polyol; and (II) a plasticizer wherein the adhesive composition is essentially free from diluent oils and solvents.

26 Claims, 1 Drawing Sheet (51) Int. Cl.

| | |
|---|---|
| B01D 65/00 | (2006.01) |
| C08G 18/76 | (2006.01) |
| C08G 18/65 | (2006.01) |
| C08G 18/69 | (2006.01) |
| C08G 18/36 | (2006.01) |
| C09J 175/04 | (2006.01) |
| B01D 61/10 | (2006.01) |
| B01D 63/10 | (2006.01) |

(52) U.S. Cl.
CPC ......... *C08G 18/36* (2013.01); *C08G 18/6588* (2013.01); *C08G 18/69* (2013.01); *C08G 18/76* (2013.01); *C08G 18/7671* (2013.01); *C09J 175/04* (2013.01); *B01D 2313/04* (2013.01)

(58) Field of Classification Search
CPC .... C08G 18/6588; C08G 18/69; C08G 18/76; C08G 18/7671; C09J 175/04
See application file for complete search history.

(56) References Cited

U.S. PATENT DOCUMENTS

| | | |
|---|---|---|
| 3,962,094 A | 6/1976 | Davis et al. |
| 4,008,197 A | 2/1977 | Brauer et al. |
| 4,168,258 A | 9/1979 | Brauer et al. |
| 4,170,559 A | 10/1979 | Kroplinski et al. |
| 4,224,164 A | 9/1980 | Brauer et al. |
| 4,256,617 A | 3/1981 | Kroplinski et al. |
| 4,267,044 A | 5/1981 | Kroplinski et al. |
| 4,284,506 A | 8/1981 | Tetenbaum et al. |
| 4,300,184 A | 11/1981 | Colla |
| 4,373,081 A | 2/1983 | Nachtkamp et al. |
| 4,375,521 A | 3/1983 | Arnold |
| 4,395,530 A | 7/1983 | Hammond |
| 4,444,976 A | 4/1984 | Rabito |
| 4,454,176 A | 6/1984 | Buckfelder et al. |
| 4,518,631 A | 5/1985 | Antonen |
| 4,603,188 A | 7/1986 | Kusakawa et al. |
| 4,842,736 A | 6/1989 | Bray et al. |
| 4,865,735 A | 9/1989 | Chu et al. |
| 4,876,303 A | 10/1989 | Chapin et al. |
| 4,879,032 A | 11/1989 | Zemlin |
| 4,886,600 A | 12/1989 | Chu et al. |
| 4,923,756 A | 5/1990 | Chung et al. |
| 4,948,508 A | 8/1990 | Nakagawa et al. |
| 5,266,145 A | 11/1993 | Duck et al. |
| 5,288,797 A | 2/1994 | Khalil et al. |
| 5,306,798 A | 4/1994 | Horn et al. |
| 5,360,543 A | 11/1994 | Usifer et al. |
| 5,556,934 A | 9/1996 | Hagquist et al. |
| 5,863,597 A | 1/1999 | Lynch |
| 5,871,822 A | 2/1999 | Lepsche et al. |
| 6,130,268 A | 10/2000 | Murray |
| 7,303,675 B2 | 12/2007 | De La Cruz |
| 7,781,513 B2 | 8/2010 | Lucas et al. |
| 8,360,390 B2 | 1/2013 | Fornage |
| 8,822,844 B1 | 9/2014 | Dimke et al. |
| 2004/0012936 A1 | 1/2004 | Gravelin |
| 2004/0072953 A1 | 4/2004 | Hung et al. |
| 2004/0138402 A1 | 7/2004 | Thiele et al. |
| 2004/0198943 A1 | 10/2004 | Slack et al. |
| 2005/0073552 A1 | 4/2005 | Smoot et al. |
| 2006/0076047 A1 | 4/2006 | Green et al. |
| 2008/0149257 A1 | 6/2008 | Tribelhorn et al. |
| 2009/0124751 A1 | 5/2009 | Lucas et al. |
| 2009/0242123 A1 | 10/2009 | Zhang et al. |
| 2013/0059082 A1 | 3/2013 | Wang et al. |
| 2014/0355225 A1 | 12/2014 | Jordan, Jr. et al. |
| 2015/0077947 A1 | 3/2015 | Jordan, Jr. et al. |
| 2016/0145476 A1 | 5/2016 | Jordan, Jr. et al. |
| 2016/0298009 A1 | 10/2016 | Dey et al. |

FOREIGN PATENT DOCUMENTS

| | | |
|---|---|---|
| EP | 0037403 A1 | 10/1981 |
| JP | H03217473 A | 9/1991 |
| JP | H0657236 A | 3/1994 |
| JP | 2006096912 A | 4/2006 |
| WO | 2004035647 A1 | 4/2004 |
| WO | 2009020774 A1 | 2/2009 |
| WO | 2009039145 A1 | 3/2009 |
| WO | 2009123905 A1 | 10/2009 |
| WO | 2012010559 A1 | 1/2012 |

OTHER PUBLICATIONS

International Search Report for International Application No. PCT/US2014/040421, International Filing Date May 31, 2014, dated Aug. 25, 2014, 3 pages.
International Search Report for International Application No. PCT/US2015/062342, International Filing Date Nov. 24, 2015, dated Apr. 7, 2016, 5 pages.
International Search Report for International Application No. PCT/US2016/026347, International Filing Date Apr. 7, 2016, dated Jun. 1, 2016, 6 pages.
Written Opinion for International Application No. PCT/US2014/040421, International Filing Date May 31, 2014, dated Aug. 25, 2014, 6 pages.
Written Opinion for International Application No. PCT/US2015/062342, International Filing Date Nov. 24, 2015, dated Apr. 7, 2016, 5 pages.
Written Opinion for International Application No. PCT/US2016/026347, International Filing Date Apr. 7, 2016, dated Jun. 1, 2016, 5 pages.
International Search Report for International Application No. PCT/US2014/067837; International Filing Date Nov. 29, 2014; dated Feb. 23, 2015; 4 pages.
Written Opinion of the International Search Report for International Application No. PCT/US2014/067837; International Filing Date Nov. 29, 2014; dated Feb. 23, 2015; 6 pages.
Wypych; "Plasticizers Use and Selection for Specific Polymers"; ChemTec Laboratories, Inc., Toronto, Canada; Handbook of Plasticizers; Chapter 11; 107 pages; No Date.

POLYURETHANE ADHESIVES FOR REVERSE OSMOSIS MODULES

RELATED APPLICATIONS

The instant application claims priority benefit to U.S. Provisional Patent Application No. 61/951,714 entitled "Polyurethane Adhesives for Reverse Osmosis Modules" filed on Mar. 12, 2014, the entirety of which is incorporated herein by reference.

FIELD

The instant invention generally relates to polyurethane adhesives. More specifically, the instant invention relates to polyurethane adhesives used for fabricating reverse osmosis (RO) modules.

BACKGROUND

Reverse osmosis is the process of forcing a solvent from a region of high solute concentration through a semipermeable membrane to a region of low solute concentration. The process is done by applying a pressure in excess of the osmotic pressure. Reverse osmosis has numerous applications, including, but not limited to, the separation of pure water from seawater and brackish waters where seawater or brackish water is pressurized against one surface of the membrane, causing transport of salt-depleted water across the membrane and emergence of potable drinking water from the low-pressure side. Other applications of reverse osmosis include concentrating food liquids, e.g., orange juice, production of maple syrup, and production of hydrogen.

There are typically two types of semipermeable membrane configurations used for reverse osmosis: spiral wound cartridges and hollow core. The membranes have a dense layer in the polymer matrix where the separation of solute from solvent occurs. In most cases, the membrane is designed to allow only solvent (such as water) to pass through this dense layer, while preventing the passage of solutes (such as salt ions). As discussed in U.S. Pat. No. 4,842,736, spiral wound cartridges include adhesives to seal the interstices or voids in the membrane, which prevents leakage of feed fluid to the permeate collection tube. In a particular example, as discussed in U.S. Pat. No. 7,303,675, the adhesive can be applied to an upstream surface of a membrane material in locations where a downstream surface has been treated that flow therethrough is prevented. The adhesive can be applied in other locations of the membrane material as required by the structure and/or application the membrane is utilized in, such as, for example, folds of the membrane, along longitudinal edges, a downstream surface, and the like.

Since the cartridge is subjected to high water pressure, the fully-cured adhesive must be strong and durable. If the hardness of the fully-cured adhesive is too low, then the pressure of the water can cause failure of the adhesive bond, and ultimately the failure of the cartridge. However, if the hardness of the fully-cured adhesive is too high then the adhesive can become brittle and also cause failure. The hardness of the adhesive can be measured on the Shore hardness scale, and the methods of taking such measurements are known in the art. Further, it is noted that the tensile strength of a fully-cured adhesive is used as a measure of suitability of the adhesive in a reverse osmosis module. One skilled in the art will appreciate that a further characteristic of a successful adhesive is the ability of the adhesive to penetrate the membrane material in order to establish a sufficient adhesive bond.

As noted in U.S. Pat. No. 7,303,675, it has been found that over time, and through use of cleaning solutions, traditionally used adhesives may crack or blister (often referred to as "osmotic blistering"), which results in side seal leakage and end seal leakage (often referred to as "veining" or "lightning bolt" failure) of the feed fluid to the permeate collection tube. Osmotic blistering may also encourage bacterial growth and may also cause dimensional change of the membrane, making it difficult to remove and replace. Osmotic blistering is exacerbated by the use of alkaline cleaning fluids, such as, for example, sodium hydroxide solution, which are frequently used in the industry. Thus, there is a need for an improved adhesive composition that also has an increased or improved resistance to alkaline fluids while retaining the performance requirements noted above.

The present invention is believed to be an answer to the need of providing an adhesive that is durable in reverse osmosis applications and is resistant to alkaline fluids.

SUMMARY

The adhesive composition of the present invention surprisingly reduces or eliminates osmotic blistering and veining and lightning bolt failures often exhibited in known adhesive compositions. The adhesive compositions of the present invention also minimizes the width of the bond line used in the reverse osmosis module application while demonstrating improved rheology, viscosity and flow control as compared to known adhesive compositions.

In one aspect, the invention is directed to an adhesive composition suitable for reverse osmosis modules, the adhesive composition comprising: (I) from about 65 wt % to 99 wt % of a polyurethane composition based on a total wt % of the adhesive composition, the polyurethane composition comprising: (A) an isocyanate group-containing pre-polymer comprising a reaction product of (i) castor oil or a derivative thereof; and (ii) a polyisocyanate; and (iii) optionally a second polyol; and (B) an isocyanate-reactive polyol mixture comprising: (i) a polybutadiene polyol; and (ii) a urethane catalyst; and (iii) optionally the second polyol; and (II) from about 1 wt % to about 35 wt % of a plasticizer based on the total wt % of the adhesive composition, wherein the adhesive composition is essentially free from diluent oils and solvents.

A further aspect of the invention is directed to an adhesive composition suitable for reverse osmosis modules, the adhesive composition comprising: (I) from about 65 wt % to about 99 wt % of a polyurethane composition, based on a total weight of the adhesive composition, the polyurethane composition comprising: (A) an isocyanate group-containing pre-polymer comprising a reaction product of (i) castor oil or a derivative thereof; and (ii) a polyisocyanate; and (B) an isocyanate-reactive polyol mixture comprising: (i) polybutadiene polyol; (ii) a urethane catalyst; and (iii) a secondary polyol; and (II) from about 1 wt % to about 35 wt % of a plasticizer, based on the total wt % of the adhesive composition, wherein the adhesive composition is essentially free from diluents oils and solvents, further wherein a tensile strength of the adhesive composition when fully cured is at least 1,000 psi, and a Shore hardness of the adhesive composition when fully cured is between about 35 D and about 75 D.

A further aspect of the invention is directed to a reverse osmosis module comprising an adhesive composition according to any of the adhesive compositions described herein.

Still a further aspect of the invention is directed to a method of constructing a reverse osmosis module, the method comprising: applying an adhesive composition to at least a portion of a membrane present in the reverse osmosis module, the adhesive composition according to any of the adhesive compositions described herein.

These and other aspects are discussed in more detail herein.

DETAILED DESCRIPTION

In general, the invention is directed to an adhesive composition that includes a polyurethane composition and a plasticizer. The adhesive composition is essentially free from diluent oils and solvents. The term "essentially free" as used herein means the composition contains unavoidable levels but no more. Diluent oils and solvents are not part of the adhesive composition and the term "diluent oils and solvents" refer to compositions that do not include the polyurethane adhesive, i.e., they are not reacted with the polyisocyanate in the adhesive composition, and include, but are not limited to hydrocarbons, e.g., petroleum spirits, kerosene, mineral oils and vegetable oils such as corn oil, canola oil, and olive oil. The adhesive composition can be used, for example, in a reverse osmosis module and the inventors have surprisingly found that adhesive compositions according to the embodiments herein reduces or eliminates osmotic blistering and leakage in reverse osmosis modules.

The adhesive composition includes a two-part polyurethane composition (hereinafter referred to as a "polyurethane composition") and a plasticizer. In one embodiment, the adhesive composition includes from about 65 wt. % to about 99 wt. % of the polyurethane composition (or any amount in between) and from about 1 wt. % to about 35 wt. % plasticizer (or any amount in between) based on the total wt. % of the adhesive composition. It is contemplated that other amounts of the polyurethane composition may be present in the adhesive composition, such as, for example, the polyurethane may be present in an amount between about 75 wt. % and 99 wt. % or any amount in between, based on the total weight of the adhesive composition. In another example, the polyurethane may be present in an amount between about 85 wt. % and 99 wt. % or any amount in between, based on the total weight of the adhesive composition. The plasticizer may be present in the adhesive composition in and amount between about 1 wt. % and 35 wt. % or any amount in between, based on the total weight of the adhesive composition. In one example, the plasticizer may be present in the adhesive composition in an amount between about 20 wt. % and about 30 wt. % or any amount in between, based on the total weight of the adhesive composition.

The polyurethane composition used in the adhesive composition includes part (A), which is an isocyanate group-containing pre-polymer comprising a reaction product of castor oil or a derivative thereof and a polyisocyanate and optionally a second polyol; and part (B), which is an isocyanate-reactive polyol mixture comprising a polybutadiene polyol and a urethane catalyst and optionally the second polyol. Part (A) and part (B) of the polyurethane composition can be mixed together in any manner known in the art, including, but not limited to hand mixing, static mixing, and dynamic mixing. It is also noted that part (A) can be added to part (B) or vice versa, or, in the alternative, part (A) and part (B) can be simultaneously added to the same vessel.

The castor oil, i.e., ricinoleic acid triglyceride, present in the isocyanate group-containing pre-polymer of part (A) is a renewable raw material that is widely commercially available. It is noted that a derivative of castor oil includes any polyol derived from castor oil, which includes a hydrolysis product, an ethoxylated product, a transesterified product, or an esterified product, or a polyamide product.

The polyisocyanate used to prepare the prepolymer of part (A) of the polyurethane composition is any compound having at least two isocyanate moieties. Diisocyanates can be exemplified by 1,5-naphthylene diisocyanate, 4,4'-diphenylmethane diisocyanate (4,4'-MDI), 2,4'-diphenylmethane diisocyanate (2,4'-MDI), 4,4'-diphenyldimethylmethane diisocyanate, 4,4'-dibenzyl diisocyanate, dialkyldiphenylmethane diisocyanate, 1,3-phenylene diisocyanate, 1,4-phenylene diisocyanate, toluene diisocyanate, butane-1,4-diisocyanate, hexamethylene diisocyanate, isopropylene diisocyanate, naphthylene diisocyanate, methylene diisocyanate, 2,2,4-trimethylhexamethylene diisocyanate, cyclohexane-1,4-diisocyanate, xylylene diisocyanate, hydrogenated xylylene diisocyanate, isophorone diisocyanate, lysine diisocyanate, dicyclohexylmethane-4,4'-diisocyanate, 1,3-bis(isocyanatomethyl)cyclohexane, methyl-cyclohexane diisocyanate, m-tetramethylxylylene diisocyanate, 2,4,6-triisopropylbenzene diisocyanate, isopropylidene bis(4-cyclohexylisocyanate), and mixtures thereof. Exemplary mixtures of diisocyanates include mixtures of 4,4'-MDI and 2,4-MDI.

The polyisocyanate used to prepare the part (A) prepolymer can also be a polyisocyanate prepared, for example, by reacting a diisocyanate with a diisocyanate-reactive compound such as a polyol e.g., a diol or polyamine, e.g., a diamine. Exemplary polyisocyanates used to prepare the part A prepolymer include polymeric forms of MDI. The polyisocyanate used to prepare the part (A) prepolymer can also be a carbodimide-modified diisocyanate, e.g., a carbodiimide-modified MDI. The polyisocyanate used to prepare the prepolymer of part (A) has an isocyanate (NCO) content that varies from 15% to 40% (mass percent) as measured by ASTM D2572.

The isocyanate (NCO) content of the part (A) prepolymer varies from 5% to 25% (mass percent). In another embodiment, the isocyanate (NCO) content of the part (A) prepolymer varies from 10% to 20% (mass percent), and more preferably between 13% to 19% (mass percent) as measured by ASTM D2572.

The part (A) prepolymer of the polyurethane composition may contain a second polyol. In general, the optional second polyol in part (A) of the polyurethane composition is any polyol (i.e., a compound having more than one hydroxyl group appended thereto) that can react with an isocyanate group. More specifically, the second polyol is preferably chosen from a group of polyols having a molecular weight of less than about 600. In one example, the second polyol is chosen from a group of polyols having a molecular weight of between about 80 and about 300. In another example, the second polyol is chosen from a group of polyols having a molecular weight of between about 80 and about 200. In a further example, the second polyol is chosen from a group of polyols having a molecular weight of between about 300 and about 600.

Examples of second polyols include glycols, i.e., diols containing a 1,2 dihydroxy group such as ethylene glycol or propylene glycol and derivatives thereof, and glycerol or glycerin and derivatives thereof. Examples of second polyols include polypropylene glycol and polytetramethylene ether glycol. In an embodiment, the second polyol is a diol having from 3 to 20 carbon atoms. In another embodiment, the second polyol is a diol having 4 to 12 carbon atoms. In a further embodiment, the second polyol is a diol having 5 to 10 carbon atoms. Examples of such diols include, but are not limited to: 2-ethyl-1,3-hexanediol; 1,2-propanediol; 1,3-butanediol; 2,2,4-trimethyl-1,3-pentanediol, 1,12-octadecanediol; 1,2-hexanediol; 1,2-octanediol; and 1,2-decanediol. Further examples of second polyols include a tetrol such as pentaerythritol. The second polyol can be a polyether polyol prepared from either ethylene oxide and/or propylene oxide optionally reacted with another polyol such as glycol or glycerol.

The polybutadiene polyol of part (B) of the polyurethane composition is a low molecular weight, hydroxyl terminated homopolymer of butadiene. Examples of polybutadiene polyols include, but are not limited to, liquid hydroxyl terminated polymers of butadiene sold under the names Poly Bd® R-45HTLO and Poly Bd® R-20LM, both commercially available from Cray Valley USA, LLC, Exton, Pa., USA, as well as under the name Hypro™ 2800X95 HTB, commercially available from CVC Thermoset Specialties, Moorestown, N.J., USA.

The urethane catalyst of part (B) of the polyurethane composition maybe any urethane catalyst. Examples of urethane catalysts include tin catalysts such as dialkyl tin dialkanoates, for example, Fomrez catalyst UL-28 (dimethyltin dineodecanoate), which provides very short gel and tack-free times as well as good solubility in polyurethane systems. Other examples of urethane catalysts include, but are not limited to: stannous octoate, commercially available as Dabco® T-9 from Air Products, Allentown, Pa., USA; organotin, commercially available as Dabco® 131 from Air Products, Allentown, Pa., USA; 1,4-diazabicyclooctane, available as Dabco® Crystalline Catalyst from Air Products, Allentown, Pa., USA; n-cetyl-n,n-dimethylamine, available as Dabco® B-16 from Air Products, Allentown, Pa., USA; dibutyltin dilaurate, available as Dabco® T-12 from Air Products, Allentown, Pa., USA; dibutyltin diacetate, available as Metacure™ T-1 catalyst from Air Products, Allentown, Pa., USA; a blend of zinc neodecanoate, bismuth neodecanoate and neodecanoic acid, available as BiCat 8 from Shepherd Chemical Company, Norwood, Ohio, USA; ferric acetylacetonate, available as Amspec GCR-56 from Amspec Chemical Corporation, Bear, Del., USA; and oleic acid, available as Oleic Acid 105 from Acme-Hardesty Company, Blue Bell, Pa., USA.

The optional second polyol that may be used in part (B) of the polyurethane composition includes the same second polyols as described in relation to part (A) above. It is contemplated that if the part (A) and part (B) of the polyurethane composition both include the second polyol, the second polyol may be the same or different.

Either or both part (A) and part (B) of the polyurethane composition may also include a defoamer. In one embodiment, a defoamer is added in an amount between about 0.01 and about 0.1 wt. % to part (A). In another embodiment, a defoamer is added in an amount between about 0.01 and about 0.1 to part (B). In a further embodiment, a defoamer is added in an amount between about 0.005 and about 0.05 to part (A) and in an amount between about 0.005 and about 0.05 to part (B). The defoamer utilized in either or both part (A) and part (B) of the polyurethane composition may be any defoamer that is known in the art. In one example, the defoamer is a silicone based defoamer, such as, for example, an alkyl aryl silicone polymer-based antifoaming additive, commercially available as SF8843 from Momentive Performance Materials Holdings LLC, Columbus, Ohio, USA. In another embodiment, the defoamer is a silicone free defoamer, such as a isoparaffin based defoamer, such as, for example, BYK 054, available from BYK USA, Inc., Wallingford, Conn., USA.

The viscosity of part (A) of the polyurethane composition is at least 600 cps. In one embodiment, the viscosity of part (A) of the polyurethane composition is between about 600 cps and about 50,000 cps, including any value therebetween. In another embodiment, the viscosity of part (A) of the polyurethane composition is between about 10,000 cps and about 50,000 cps, including any value therebetween. In a further embodiment, the viscosity of part (A) of the polyurethane composition is between about 20,000 cps and about 40,000 cps, including any value therebetween. In yet a further embodiment, the viscosity of part (A) of the polyurethane composition is between about 30,000 cps and about 35,000 cps, including any value therebetween. The viscosity of part (A) of the polyurethane composition is measured after all of the components of part (A) are combined.

The viscosity of part (B) of the polyurethane composition is at least 600 cps. In one embodiment, the viscosity of part (B) of the polyurethane composition is between about 600 cps and about 50,000 cps, including any value there between. In another embodiment, the viscosity of part (B) of the polyurethane composition is between about 1,000 cps and about 50,000 cps, including any value therebetween. In a further embodiment, the viscosity of part (B) of the polyurethane composition is between about 1,000 cps and about 40,000 cps, including any value therebetween. In yet a further embodiment, the viscosity of part (B) of the polyurethane composition is between about 1,000 cps and about 30,000 cps, including any value therebetween.

It is contemplated that the polyurethane composition of the adhesive composition can contain any ratio or amount of part (A) and part (B). In one example, the polyurethane composition contains about 10 wt. % to about 90 wt. % of part (A) and about 10 wt. % to about 90 wt. % of part (B). Other examples are contemplated wherein the polyurethane composition contains about 20 wt. % to about 80 wt. % of part (A) and about 20 wt. % to about 80 wt. % of part (B); 30 wt. % to about 75 wt. % of part (A) and about 25 wt. % to about 70 wt. % of part (B), and any amount therebetween. In a particular example, the polyurethane composition contains about 50 wt. % part (A) and about 50 wt. % part (B), i.e., part (A) and part (B) are mixed in a 1:1 ratio.

As noted above, the second polyol is optional in part (A) and part (B) of the polyurethane composition. It is contemplated that neither part (A) nor part (B) of the polyurethane composition may include the second polyol. It is also contemplated that either one or both of part (A) and part (B) may include the second polyol. In one embodiment of the polyurethane composition, part (A) or part (B) includes at least 4 wt. % of the second polyol based on a total wt. % of part (A) and part (B). In another embodiment of the polyurethane composition, part (A) or part (B) includes at least 6 wt. % of the second polyol based on a total wt. % of part (A) and part (B). In another embodiment of the polyurethane composition, part (A) or part (B) includes at least 10 wt. % of the second polyol based on a total wt. % of part (A) and part (B). In a further embodiment, part (A) and part (B) of the polyurethane composition has between about 4 wt. % to about 30 wt. % of the second polyol based on a total wt. % of part (A) and part (B).

In addition to the aforementioned polyurethane composition, the adhesive composition also includes a plasticizer. In one embodiment, the plasticizer is added to part (B), and then part (B) containing the plasticizer is mixed with part (A). In another embodiment, the plasticizer is added to part (A) and then part (A) containing the plasticizer is mixed with part (B). In another embodiment, the plasticizer is added both in part (A) and part (B) and then mixed together to form the polyurethane composition.

The plasticizer can be any plasticizer capable of being used in an adhesive composition. Suitable plasticizers include, but are not limited to, azelates, sebacates, maleates, succinates, phthalates, adipates, dicarboxylic/tricarboxylic ester-based plasticizers, phosphates, trimellitates, glutarates, citrates, dipropylene glycol dibenzoates, diethylene glycol dibenzoates, epoxidized soybean oil, esters of soybean oil or combinations of any of the foregoing plasticizers. In one embodiment, the plasticizer has a maximum water content of 0.04 wt. % based on the total weight of the plasticizer.

Examples of phthalate-based plasticizers include, but are not limited to: bis(2-ethylhexyl) phthalate, diisononyl phthalate, di-n-butyl phthalate, butyl benzyl phthalate, diisodecyl phthalate, do-n-octyl phthalate, diisooctyl phthalate, diethyl phthalate, diisobutyl phthalate, dioctyl phthalate, diundecyl phthalate, and di-n-hexyl phthalate.

Examples of trimellitates include, but are not limited to: trimethyl trimellitate, tri-(2-ethylhexyl)trimellitate, tri-(n-octyl, n-decyl)trimellitate, tri-(heptyl, nonyl)trimellitate, n-octyl trimellitate.

Examples of adipates, glutarates, dicarboxylic acids, phosphates, sebacates, and maleates include, but are not limited to: 1,2-benzene dicarboxylic acid, polyester glutarate, o-isopropylphenyl diphenyl phosphate, tri-n-butyl citrate, dialky diether glutarate, bis(2-ethylhexyl)adipate, dioctyl adipate, polyester adipate, dimethyl adipate, monomethyl adipate, diisodecyl adipate, diisononyl adipate, bis(2-ethylhexyl)sebacate, bis(2-ethylhexyl)azelainate, tri(2-ethylhexyl)trimellitate, di(C7-9-alkyl) adipate, butyl fumarate, diisobutyl fumarate, bis(2-ethylhexyl)fumarate, diethyl maleate, dimethyl maleate, diheptyl adipate, dioctyl adipate, dinonyl adipate, dibutyl debacate, dibutyl maleate, diisobutyl maleate.

Examples of esters of soybean oil include methyl soyate, ethyl soyate and propyl soyate. Examples of benzoates include, but are not limited to: 1-[2-(benzoyloxy)propoxy]propan-2-yl benzoate, commercially available as Benzoflex™ from Eastman Chemical Company, Kingsport, Tenn., USA.

Other example plasticizers include, but are not limited to: dioctyl terephthalate, 1,2-cyclohexane dicarboxylic acid diisononyl ester, epoxidized vegetable oils, alkyl sulphonic acid phenyl ester, N-ethyl toluene sulfonamide (ortho and para isomers), N-(2-hydroxypropyl)benzene sulfonamide, N-(n-butyl)benzene sulfonamide, tricresyl phosphate, tributyl phosphate, glycols/polyethers, organophosphates, triethylene glycol dihexanoate, tetraethylene glycol diheptanoate, polymeric plasticizers, polybutene, acetylated monoglycerides, alkyl citrates, triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl sitrate and trimethyl citrate.

Suitable commercially available plasticizers also include diisodecyl phthalate, sold as Jayflex DIDP from Exxon Mobil Chemical, Houston, Tex., USA. Other acceptable phthalate plasticizers include other Jayflex™ plasticizers from Exxon Mobil Chemical, Houston, Tex., USA, (such as, for example, Jayflex DOP), the DIOCTYL™, SANTICIZER®, and DIBUTYL™ plasticizers commercially available from Monsanto, St. Louis, Mo., USA, and the ADIMOLL®, DISFLAMOLL®, MESAMOLL®, UNIMOLL®, TEGDA™, TRIACETIN™ and ULTRAMOLL™ plasticizers commercially available from Bayer Corporation, Germany. Preferred plasticizers have low volatility, such as long chain, branched phthalates (e.g., ditridecyl phthalate, di-L-nonyl phthalate and di-L-undecyl phthalate). Useful dibenzoates are available as BENZOFLEX® 9 88, BENZOFLEX® 50 and BENZOFLEX® 400 commercially available from Velsicol Chemical Corporation, Rosemont, Ill., USA. Soybean oil is commercially available under the trade name FLEXOL™ EPO, from Dow Chemicals, DE, USA.

The polyurethane composition and the plasticizer may be combined or mixed in any manner acceptable to form the adhesive composition, which includes, but is not limited to, hand mixing, static mixing, and dynamic mixing. It is noted that the polyurethane composition may be added to the plasticizer, or vice versa, or alternatively, the polyurethane composition and plasticizer may be simultaneously added to a vessel to form the adhesive composition.

The adhesive composition may include a filler, or a rheology modifier preferably being a thixotropic agent ("thixotrope(s)") or a combination thereof, which may be added to part (A) and/or part (B) of the polyurethane composition. The filler may be any suitable filler known in the art, including, but not limited to talc, calcium carbonate, barium sulfate, magnesium hydroxide, clay, mica, titanium dioxide, or any combination of the foregoing. The rheology modifier includes all synthetic and natural anti-sagging additives from BYK Additives/Elements Specialties, Wallingford, Conn., USA, along with primary amine-terminated polyether compounds. Primary amine-terminated polyether compounds include, but are not limited to polyoxypropylene amine having a molecular weight from about 110 or 200, to preferably about 500 (although molecular weights up to about 2000 are suitable) and an amine functionality of about 2 to 3, preferably about 2. Such primary amino-terminated polyethers are manufactured and sold by Huntsman Corporation, Salt Lake City, Utah, under the name Jeffamine. Particularly preferred is Jeffamine D-230, which is a polyoxypropylene glycol terminated with primary amines and having an amine functionality of 2 and a molecular weight of about 230. Crosslinking in the adhesive composition can be further accelerated by adding a hydroxyl-containing tertiary amine such as diisoproponol amine commercially available as QUADROL by BASF Corp., Germany. Thixotropy develops rapidly when part (A) and part (B) of the polyurethane composition are mixed together in the presence of such amines. Thixotropic agents include, but are not limited to, inorganic additives and can include, for example, fumed silica, amorphous silicon dioxide, clays, bentonites, talcs, and the like, and combinations thereof.

When the polyurethane composition and the plasticizer are combined to form the adhesive composition, the adhesive composition typically has an initial mix viscosity of at least about 10,000 cps. It is noted that the term "initial mix" as used in "initial mix viscosity" refers to the viscosity of the adhesive composition when both parts (A) and (B) of the polyurethane and the plasticizer are first mixed together. In another example, the initial mix viscosity of the adhesive composition is between about 10,000 cps and about 40,000 cps, including any value therebetween. In another example, the initial mix viscosity of the adhesive composition is between about 10,000 cps and about 25,000 cps, including any value therebetween. In a further example, the initial viscosity of the adhesive composition is between 20,000 cps and about 35,000 cps, including any value therebetween. In another example, the initial viscosity of the adhesive composition is between 30,000 cps and 40,000 cps, including any value therebetween. While certain ranges of initial mix viscosity are provided above, it is contemplated that the initial mix viscosity of the adhesive composition can be any value higher than 20,000 cps. The initial mix viscosity can range from 5000 cps to 70,000 cps based on the processing requirements.

Figure 1:
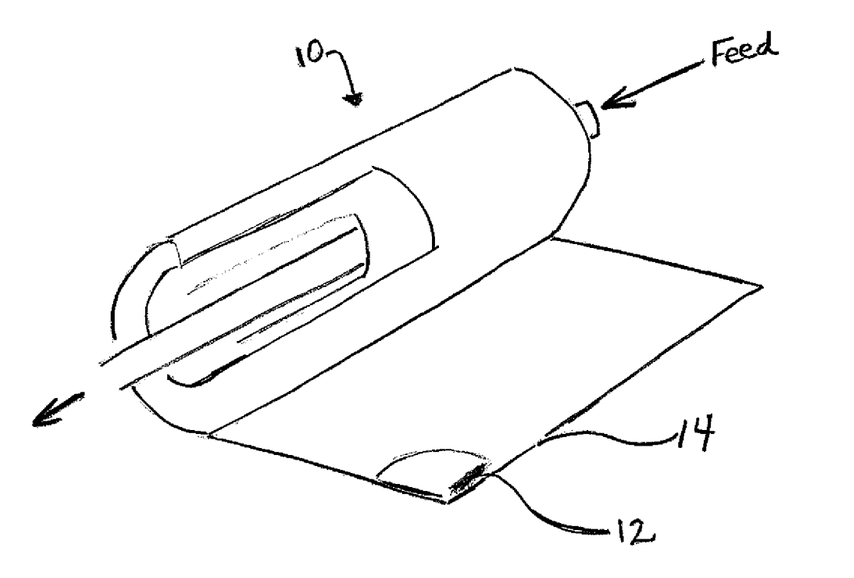
FIG. 1 is a perspective drawing of a reverse osmosis module having a membrane with an adhesive composition applied thereto.

The adhesive compositions should be flexible in order to penetrate the interstices and voids in the membrane of a reverse osmosis module, but also should be strong enough to result high pressures to which the membrane is subjected to use thereof. After mixing the aforementioned components to form the adhesive composition, the adhesive composition is applied to the membrane of the reverse osmosis module. The adhesive composition is cured after application to the membrane. An example reverse osmosis module 10 is illustrated in FIG. 1, wherein the adhesive composition 12 is shown applied to at least a portion of a membrane 14. The example shown in FIG. 1 is only used for illustration purposes and is not meant to be limiting to the scope of the present invention.

The adhesive composition can be cured through room temperature curing or heat curing. When the adhesive composition is fully cured, the adhesive will have certain properties that help impart beneficial characteristics to the adhesive composition when used in a reverse osmosis module. The adhesive composition typically has a Shore hardness of greater than about 20 A when fully cured. In another example, the adhesive composition has a Shore hardness of at least about 30 A when fully cured, while in another example the adhesive composition has a Shore hardness of at least about 40 A when fully cured. In yet a further example, the adhesive composition has a Shore hardness of at least about 35 D when fully cured. In a further example, the adhesive composition has a Shore hardness of between 35 D and 80 D when fully cured. In another example, the adhesive composition has a Shore hardness of between 60 A and 80 D.

When fully cured, the adhesive composition should have tensile strength of greater than 100 psi, preferably greater than 500 psi. In another example, the adhesive composition has a tensile strength of greater than 1,000 psi, preferably greater than 2,000 psi when fully cured. The tensile strength can be measured by, for example, the Instron Tensiometer.

It is contemplated that the adhesive composition can be applied to a desired membrane using any technique known in the art to apply such adhesives. For example, the adhesive composition may be applied to a membrane of a reverse osmosis module using any commercially available coater, such as a slot die coater. The adhesive composition may be applied as a layer having any desired thickness. In one example, the adhesive composition is applied in a layer of about 0.2 to about 4 mil thick, although other thicknesses can be applicable.

The invention includes at least the following embodiments:

Embodiment 1

An adhesive composition suitable for reverse osmosis modules, the adhesive composition comprising:
(I) from about 65 wt. % to 99 wt. % of a polyurethane composition based on a total wt. % of the adhesive composition, the polyurethane composition comprising:
  (A) an isocyanate group-containing pre-polymer comprising a reaction product of (i) castor oil or a derivative thereof; and (ii) a polyisocyanate; and (iii) optionally a second polyol; and
  (B) an isocyanate-reactive polyol mixture comprising:
    (i) a polybutadiene polyol; and (ii) a urethane catalyst; and (iii) optionally the second polyol; and
(II) from about 1 wt % to about 35 wt % of a plasticizer based on the total wt % of the adhesive composition, wherein the adhesive composition is essentially free from diluent oils and solvents.

Embodiment 2

The adhesive composition according to embodiment 1, wherein an initial mix viscosity of the adhesive composition is at least 10,000 cps.

Embodiment 3

The adhesive composition according to any one of the preceding embodiments, wherein the initial mix viscosity of the adhesive composition is between about 10,000 cps and about 40,000 cps.

Embodiment 4

The adhesive composition according to any one of the preceding embodiments, wherein the initial mix viscosity of the adhesive composition is between about 30,000 cps and about 40,000 cps.

Embodiment 5

The adhesive composition according to any one of the preceding embodiments, wherein the initial mix viscosity of the adhesive composition is between about 20,000 cps and about 35,000 cps.

Embodiment 6

The adhesive composition according to any one of the preceding embodiments, wherein the initial mix viscosity of the adhesive composition is between about 10,000 cps and about 25,000 cps.

Embodiment 7

The adhesive composition according to any one of the preceding embodiments, further comprising a Shore hardness of greater than about 20 A when fully cured.

Embodiment 8

The adhesive composition according to any one of the preceding embodiments, further comprising a Shore hardness of at least about 30 A when fully cured.

Embodiment 9

The adhesive composition according to any one of the preceding embodiments, further comprising a Shore hardness of at least about 40 A when fully cured.

Embodiment 10

The adhesive composition according to any one of the preceding embodiments, further comprising a Shore hardness between 60 A and 80 D when fully cured.

Embodiment 11

The adhesive composition according to any of embodiments 1-6 and 9-10, further comprising a Shore hardness of at least about 35 D when fully cured.

Embodiment 12

The adhesive composition according to any one of embodiments 1-6 and 9-10, further comprising a Shore hardness between 35 D and 80 D when fully cured.

Embodiment 13

The adhesive composition according to any one of the preceding embodiments, wherein a tensile strength of the adhesive composition is greater than about 100 psi.

Embodiment 14

The adhesive composition of any one of the preceding embodiments, wherein a tensile strength of the adhesive composition is at least 1,000 psi when fully cured.

Embodiment 15

The adhesive composition of any one of the preceding embodiments, wherein a tensile strength of the adhesive composition is at least 2,000 psi when fully cured.

Embodiment 16

The adhesive composition according to any one of the preceding embodiments, wherein either part (A) or part (B) comprises at least 4 wt % of the second polyol based on a total weight percent of part (A) and part (B).

Embodiment 17

The adhesive composition according to any one of the preceding embodiments, wherein either part (A) or part (B) comprises at least 6 wt. % of the second polyol based on a total weight percent of part (A) and part (B).

Embodiment 18

The adhesive composition according to any one of the preceding embodiments, wherein either part (A) or part (B) comprises at least 10 wt. % of the second polyol based on a total weight of part (A) and part (B).

Embodiment 19

The adhesive composition according to any one of the preceding embodiments, wherein the second polyol is chosen from a group of polyols having a molecular weight less than about 600.

Embodiment 20

The adhesive composition according to any one of the preceding embodiments, wherein the second polyol is a polyol having a molecular weight between 80-300 Daltons.

Embodiment 21

The adhesive composition according to embodiment 20, wherein the second polyol is a diol.

Embodiment 22

The adhesive composition according to embodiment 19 wherein the second polyol is selected from the group consisting of 2-ethyl-1,3-hexanediol; 1,2-propanediol; 1,3-butanediol; 2,2,4-trimethyl-1,3-pentanediol, 1,12-octadecanediol; 1,2-hexanediol; 1,2-octanediol; and 1,2-decanediol.

Embodiment 23

The adhesive composition according to embodiment 19, wherein the second polyol is a polypropylene glycol or a polytetramethylene ether glycol.

Embodiment 24

The adhesive composition according to any one of the preceding embodiments, wherein at least one of part (I)(A) and part (I)(B) further comprise a filler, a thixotropic agent or a combination thereof.

Embodiment 25

The adhesive composition according to embodiment 24, wherein at least one of part (I)(A) and part (I)(B) comprise a filler selected from the group consisting of talc, calcium carbonate, barium sulfate, magnesium hydroxide, clay, mica, titanium dioxide, and combinations thereof.

Embodiment 26

The adhesive composition according to embodiment 24, wherein part (I)(B) of the adhesive composition further comprises a thixotropic agent.

Embodiment 27

The adhesive composition according to embodiment 26, wherein the thixotropic agent is selected from the group consisting of fumed silica, amorphous silicon dioxide, talc, clay and combinations thereof.

Embodiment 28

The adhesive composition according to any one of the preceding embodiments, wherein part (I) of the adhesive composition includes between about 10 wt. % and about 90 wt. % of part (A) based on the total weight of part (I) and between about 10 wt. % and about 90 wt. % of part (B) based on the total weight of part (I).

Embodiment 29

The adhesive composition according to any one of the preceding embodiments, wherein part (I) of the adhesive composition includes between about 20 wt. % and about 80 wt. % of part (A) based on the total weight of part (I) and between about 20 wt. % and about 80 wt. % of part (B) based on the total weight of part (I).

Embodiment 30

The adhesive composition according to any one of the preceding embodiments, wherein part (I) of the adhesive composition includes between about 30 wt. % and about 70 wt. % of part (A) based on the total weight of part (I) and between about 30 wt. % and about 70 wt. % of part (B) based on the total weight of part (I).

Embodiment 31

The adhesive composition according to any one of the preceding embodiments, wherein part (I) of the adhesive composition includes about 50 wt. % of part (A) based on the total weight of part (I) and about 50 wt. % of part (B) based on the total weight of part (I).

Embodiment 32

An adhesive composition suitable for reverse osmosis modules, the adhesive composition comprising:
(I) from about 65 wt % to about 99 wt % of a polyurethane composition, based on a total weight of the adhesive composition, the polyurethane composition comprising:
  (A) an isocyanate group-containing pre-polymer comprising a reaction product of (i) castor oil or a derivative thereof; and (ii) a polyisocyanate; and
  (B) an isocyanate-reactive polyol mixture comprising:
    (i) polybutadiene polyol; (ii) a urethane catalyst; and
    (iii) a secondary polyol; and
(II) from about 1 wt. % to about 35 wt. % of a plasticizer, based on the total wt % of the adhesive composition, wherein the adhesive composition is essentially free from diluents oils and solvents, further wherein a tensile strength of the adhesive composition when fully cured is at least 1,000 psi, and a Shore hardness of the adhesive composition when fully cured is between about 35 D and about 75 D.

Embodiment 33

The adhesive composition according to any one of the preceding embodiments, wherein the plasticizer is selected from the group consisting of azelates, sebacates, maleates, succinates, phthalates, adipates, dicarboxylic/tricarboxylic ester-based plasticizers, phosphates, trimellitates, glutarates, citrates, dipropylene glycol dibenzoates, diethylene glycol dibenzoates, epoxidized soybean oil, esters of soybean oil, and combinations thereof.

Embodiment 34

The adhesive composition according to any one of the preceding embodiments, wherein the plasticizer is selected from the group consisting of dipropylene glycol dibenzoates, diethylene glycol dibenzoates, epoxidized soybean oil, esters of soybean oil, diheptyl adipate, dioctyl adipate, dinonyl adipate, and combinations thereof.

Embodiment 35

A reverse osmosis module comprising an adhesive composition according to any one of the preceding embodiments.

Embodiment 36

A reverse osmosis module comprising an adhesive composition according to embodiment 32.

Embodiment 37

A method of constructing a reverse osmosis module, the method comprising:
applying an adhesive composition to at least a portion of a membrane present in the reverse osmosis module, the adhesive composition according to any one of embodiments 1-31.

Embodiment 38

A method of constructing a reverse osmosis module, the method comprising:
applying an adhesive composition to at least a portion of a membrane present in the reverse osmosis module, the adhesive composition according to any one of embodiments 32-34.

Adhesive compositions according to one or more of the foregoing embodiments are further discussed in the Examples provided below.

EXAMPLES

The following components listed in Table 1 are used in Examples I-IX, which are detailed in Tables 2 and 3 below.

TABLE 1

| Chemical Used & Trade Names: | | |
|---|---|---|
| Chemical Composition | Trade Name | Supplier |
| Diisocyante Diphenylmethane Diisocyanate (MDI) ~22.8% NCO | MONDUR PF | Bayer Material Science |
| Castor Oil | | VERTELLUS PERFORMANCE MATERIALS INC. |
| Silicone Based Defoamer/Anti foaming additive | SF 8843 | Momentive |
| Polybutadiene Diol | R-20LM/ R45-HTLO | Total Petrochemicals |
| Dipropylene glycol dibenzoate | Benzoflex(TM) 9-88 SG | Eastman Chemicals |

TABLE 1-continued

Chemical Used & Trade Names:

| Chemical Composition | Trade Name | Supplier |
|---|---|---|
| Fumed Silica Thixotrope | CAB-O-SIL M5 | Cabot Corporation |
| 2-Ethyl-1,3-Hexanediol (Second Polyol) | EH Diol | Dixie Chemical Company, Inc. |
| Dimethylbis[(1-oxoneodecyl)oxy]stannane Catalyst | Fomrez* catalyst UL-28 | Momentive |

Table 2 provides the components for part (A) and part (B) of the polyurethane composition and the plasticizer of the adhesive composition in Examples I-II, which are adhesive compositions according to the invention. Table 2 also provides the components for Examples III-IV (comparative adhesive compositions). In Examples I-IV, part (B) of the polyurethane composition does not include a second polyol.

Parts (A) and (B) of the adhesive compositions in Examples I-IX are synthesized according to the following procedures.

Protocol for Synthesizing Part (A) in Examples I-IX:

Weighed diisocyanate is charged into a reaction vessel equipped for agitation, vacuum, heating and cooling. SF 8843 defoamer is added to the reaction vessel. With agitation, 90 mole % (based on isocyanate) of the castor oil is added to the reaction vessel, at such a rate that the temperature rise does not exceed 85° C. After the castor oil is added, the reaction vessel is sealed under vacuum (at least at about 27 inch. Hg) and then heated at a temperature between about 80° C. to about 85° C. for four (4) hours to form the isocyanate group-containing pre-polymer of part (A).

A sample of the isocyanate group-containing pre-polymer of part (A) is analyzed to determine NCO content according to ASTM D 2572. When necessary, additional castor oil is added and reacted under vacuum at a temperature between about 80° C. to about 85° C. for 2 hours to lower the NCO content to the target NCO value, i.e. 5% to 25% (mass percent) NCO content. If the calculated NCO content is lower than the target value, extra diisocyanate is added to increase the NCO content. The NCO content is determined again to ensure the NCO content is within the target value prior to use.

Protocol for Synthesizing Part (B) in Examples I-IV:

In the adhesive compositions of Examples I-IV, part (B) of the polyurethane composition does not include a second polyol and a thixotrope. Each of the adhesive compositions in Examples I-IV is synthesized by blending the polybutadiene diol, plasticizer and defoamer in a vessel for 30 minutes. Water is then stripped from the mixture so that the water content of the mixture is less than 0.04 wt. %. The catalyst is then added and the mixture is stirred between 40 and 45 minutes to result in a homogenous mixture.

Protocol for Synthesizing Part (B) in Examples VI-IX

In the adhesive compositions of Examples VI-IX, part (B) of the polyurethane composition includes a second polyol and a thixotrope. Each of the adhesive compositions in Examples VI-IX is synthesized by blending the polybutadiene diol, plasticizer and defoamer in a vessel for 30 minutes. Water is then stripped from the mixture so that the water content of the mixture is less than 0.04 wt. %. The second polyol, secondary diol EH diol, is added to, and blended with, the mixture after it is stripped of water so that the water content is 0.04 wt. % or less. The catalyst is then added to the mixture at room temperature and mixed followed by the thixotrope. The thixotrope is added to the mixture at room temperature and is mixed between 40 minutes and 45 minutes until a homogenous mixture is obtained.

TABLE 2

| | Examples I-IV | | | |
|---|---|---|---|---|
| | Example I Invention wt. % | Example II Invention wt. % | Example III Comparative wt. % | Example IV Comparative wt. % |
| Part A | | | | |
| Diisocyanate | 80.24 | 80.24 | 80.24 | 80.24 |
| Castor Oil | 19.74 | 19.74 | 19.74 | 19.74 |
| SF 8843 defoamer | 0.02 | 0.02 | 0.02 | 0.02 |
| Part A prepolymer NCO | 16.00% | 16.00% | 16.00% | 16.00% |
| Part A prepolymer viscosity (cps) | 33,600 | 33,600 | 33,600 | 33,600 |
| Part B | | | | |
| Polybutadiene diol | 69.97 | 59.97 | 49.97 | 39.97 |
| Fomrez UL-28 catalyst | 0.01 | 0.01 | 0.01 | 0.01 |
| Benzoflex™ 9-88 plasticizer | 30 | 40 | 50 | 60 |
| Thixotrope CAB-O-SIL M5 | — | — | — | — |
| Secondary diol EH Diol | — | — | — | — |
| SF 8843 defoamer | 0.02 | 0.02 | 0.02 | 0.02 |
| Part B mixture viscosity (cps) | 1,260 | 1,092 | 824 | 620 |
| Mix Ratio by Weight | 34.8A/100B | 29.86A/100B | 24.88A/100B | 19.90A/100B |
| Plasticizer Amount (% on A + B) | 22.30% | 30.80% | 40.04% | 50.04% |
| Part A + B mixture initial viscosity (cps) | 9,600 | 8,550 | 7,350 | 6,080 |
| Shore A Hardness | 30A | 23A | 15A | 5A |
| Tensile Strength, psi | 161 | 116 | 63 | 33 |
| Tear Strength, pli | 28 | 19 | 13 | 7 |
| Alkali Resistance | | | *See below | |

Table 3 provides the components for part (A) and part (B) of the polyurethane composition and the plasticizer of the adhesive composition in Examples V-IX, which are adhesive compositions according to the invention. In Examples V-IX, part (B) of the polyurethane composition does include a second polyol.

TABLE 3

Examples V-IX

|  | Example V Invention wt. % | Example VI Invention wt. % | Example VII Invention wt. % | Example VIII Invention wt. % | Example IX Comparative wt. % |
|---|---|---|---|---|---|
| Part A |  |  |  |  |  |
| Diisocyanate | 80.24 | 80.24 | 80.24 | 80.24 | 80.24 |
| Castor Oil | 19.74 | 19.74 | 19.74 | 19.74 | 19.74 |
| SF 8843 defoamer | 0.02 | 0.02 | 0.02 | 0.02 | 0.02 |
| Part A prepolymer NCO | 16.00% | 16.00% | 16.00% | 16.00% | 16.00% |
| Part A prepolymer viscosity (cps) | 33,600 | 33,601 | 33,602 | 33,603 | 33,604 |
| Part B |  |  |  |  |  |
| Polybutadiene diol | 34.49 | 28.92 | 23.36 | 17.79 | 12.23 |
| Fomrez UL-28 catalyst | 0.01 | 0.01 | 0.01 | 0.01 | 0.01 |
| Benzoflex™ 9-88 SG plasticizer | 30 | 40 | 50 | 60 | 70 |
| Thixotrope CAB-O-SIL M5 | 8 | 8 | 8 | 8 | 8 |
| Secondary diol EH Diol | 27.48 | 23.05 | 18.61 | 14.18 | 9.74 |
| SF 8843 defoamer | 0.02 | 0.02 | 0.02 | 0.02 | 0.02 |
| Part B mixture viscosity (cps) | 25,800 | 11,200 | 4,400 | 1,460 | 620 |
| Mix Ratio by Weight | 100A/82.5B | 100A/98.38B | 82.07A/100B | 62.53A/100B | 42.96A/100B |
| Plasticizer Amount % on A + B | 13.60% | 19.84% | 27.46% | 36.91% | 48.96% |
| Second polyol % = amount in B × fraction part B | 12.42 | 11.43 | 10.22 | 8.72 | 6.81 |
| Part A + B mixture initial viscosity (cps) | 30,000 | 22,450 | 17,500 | 13,800 | 10,500 |
| Shore A Hardness | 70D | 57D | 38D | 15D | 25A |
| Tensile Strength, psi | 3,951 | 3,664 | 2,215 | 1,114 | 227 |
| Tear Strength, pli | 880 | 455 | 259 | 69 | 23 |
| Alkali Resistance |  |  | *See below |  |  |

The initial viscosity of Part A + Part B is measured immediately after mixing.
*Alkali resistance testing was performed as follows: Sample plaques of fully cured adhesive were aged at 75° C. for 72 hours in a 3% NaOH solution, then retested for hardness and deformation. All examples showed only slight yellowing with no deformation or change in hardness.

As shown in Tables 2 and 3 above, the hardness, tensile strength and tear strength of the adhesive compositions according to the present invention (Examples I, II and V-VIII) were improved in comparison to the adhesive compositions according to comparative Examples III, IV and IX.

What is claimed is:

1. An adhesive composition suitable for reverse osmosis modules, the adhesive composition comprising:
   (I) from 65 wt. % to 99 wt. % of a polyurethane composition based on a total wt. % of the adhesive composition, the polyurethane composition comprising:
      (A) an isocyanate group-containing pre-polymer comprising a reaction product of (i) castor oil or a derivative thereof; and (ii) a polyisocyanate; and (iii) optionally a second polyol; and
      (B) an isocyanate-reactive polyol mixture comprising:
         (i) a polybutadiene polyol; and (ii) a urethane catalyst; and (iii) optionally the second polyol; and
   (II) from 1 wt. % to about 35 wt. % of a plasticizer based on the total wt. % of the adhesive composition,
wherein the adhesive composition is essentially free from diluent oils and solvents;
wherein the viscosity of part (B) is at least 1,000 cps; and
wherein the adhesive composition has a Shore hardness of greater than 20 A when fully cured.

2. The adhesive composition according to claim 1, wherein an initial mix viscosity of the adhesive composition, defined as the viscosity when parts (I)(A), (I)(B), and (II) are mixed together, is at least 10,000 cps.

3. The adhesive composition according to claim 2, wherein the initial mix viscosity of the adhesive composition is between about 10,000 cps and about 40,000 cps.

4. The adhesive composition according to claim 1, wherein the Shore hardness is between 60 A and 80 D when fully cured.

5. The adhesive composition according to claim 1, wherein the Shore hardness is at least 35 D when fully cured.

6. The adhesive composition according to claim 1, wherein the Shore hardness is between 35 D and 80 D when fully cured.

7. The adhesive composition according to claim 1, wherein the adhesive composition has a tensile strength greater than 100 psi when fully cured.

8. The adhesive composition according to claim 7, wherein the tensile strength of the adhesive composition is at least 1,000 psi when fully cured.

9. The adhesive composition according to claim 8, wherein the tensile strength of the adhesive composition is at least 2,000 psi when fully cured.

10. The adhesive composition according to claim 1, wherein either part (A) or part (B) comprises at least 4 wt. % of the second polyol based on a total weight percent of part (A) and part (B).

11. The adhesive composition according to claim 10, wherein the second polyol is chosen from a group of polyols having a molecular weight less than about 600.

12. The adhesive composition according to claim 11, wherein the second polyol is a polyol having a molecular weight between 80-300 Daltons.

13. The adhesive composition according to claim 12, wherein the second polyol is a diol.

14. The adhesive composition according to claim 13, wherein the second polyol is selected from the group consisting of 2-ethyl-1,3-hexanediol; 1,2-propanediol; 1,3-butanediol; 2,2,4-trimethyl-1,3-pentanediol, 1,12-octadecanediol; 1,2-hexanediol; 1,2-octanediol; and 1,2-decanediol.

15. The adhesive composition according to claim 11, wherein the second polyol is a polypropylene glycol or a polytetramethylene ether glycol.

16. The adhesive composition according to claim 1, wherein at least one of part (I)(A) and part (I)(B) further comprise a filler, a thixotropic agent or a combination thereof.

17. The adhesive composition according to claim 16, wherein at least one of part (I)(A) and part (I)(B) comprise a filler selected from the group consisting of talc, calcium carbonate, barium sulfate, magnesium hydroxide, clay, mica, titanium dioxide, and combinations thereof.

18. The adhesive composition according to claim 16, wherein part (I)(B) of the adhesive composition further comprises a thixotropic agent.

19. The adhesive composition according to claim 18, wherein the thixotropic agent is selected from the group consisting of fumed silica, amorphous silicon dioxide, talc, clay and combinations thereof.

20. The adhesive composition according to claim 1, wherein part (I) of the adhesive composition includes between about 10 wt. % and about 90 wt. % of part (A) based on the total weight of part (I) and between about 10 wt. % and about 90 wt. % of part (B) based on the total weight of part (I).

21. The adhesive composition according to claim 20, wherein part (I) of the adhesive composition includes about 50 wt. % of part (A) based on the total weight of part (I) and about 50 wt. % of part (B) based on the total weight of part (I).

22. An adhesive composition suitable for reverse osmosis modules, the adhesive composition comprising:
(I) from 65 wt % to 99 wt % of a polyurethane composition, based on a total weight of the adhesive composition, the polyurethane composition comprising:
  (A) an isocyanate group-containing pre-polymer comprising a reaction product of (i) castor oil or a derivative thereof; and (ii) a polyisocyanate; and
  (B) an isocyanate-reactive polyol mixture comprising:
    (i) polybutadiene polyol; (ii) a urethane catalyst; and
    (iii) a secondary polyol; wherein the viscosity of part (B) is at least 1,000 cps; and
(II) from 1 wt. % to 35 wt. % of a plasticizer, based on the total wt. % of the adhesive composition,
wherein the adhesive composition is essentially free from diluents oils and solvents;
wherein a tensile strength of the adhesive composition when fully cured is at least 1,000 psi; and
wherein a Shore hardness of the adhesive composition when fully cured is between about 35 D and about 75 D.

23. The adhesive composition according to claim 22, wherein the plasticizer is selected from the group consisting of azelates, sebacates, maleates, succinates, phthalates, adipates, dicarboxylic/tricarboxylic ester-based plasticizers, phosphates, trimellitates, glutarates, citrates, dipropylene glycol dibenzoates, diethylene glycol dibenzoates, epoxidized soybean oil, esters of soybean oil, and combinations thereof.

24. The adhesive composition according to claim 23, wherein the plasticizer is selected from the group consisting of dipropylene glycol dibenzoates, diethylene glycol dibenzoates, epoxidized soybean oil, esters of soybean oil, diheptyl adipate, dioctyl adipate, dinonyl adipate, and combinations thereof.

25. A reverse osmosis module comprising an adhesive composition according to claim 1.

26. A reverse osmosis module comprising
an adhesive composition according to claim 22.

* * * * *